Oct. 7, 1969  M. TERHO  3,471,048
DEVICE FOR LOADING A TRANSPORT BOX ON
A LORRY AND UNLOADING THE SAME
Filed Oct. 17, 1967  6 Sheets-Sheet 1

Inventor:
Mikko Terho
Woodling, Krost, Granger + Krost
Attys

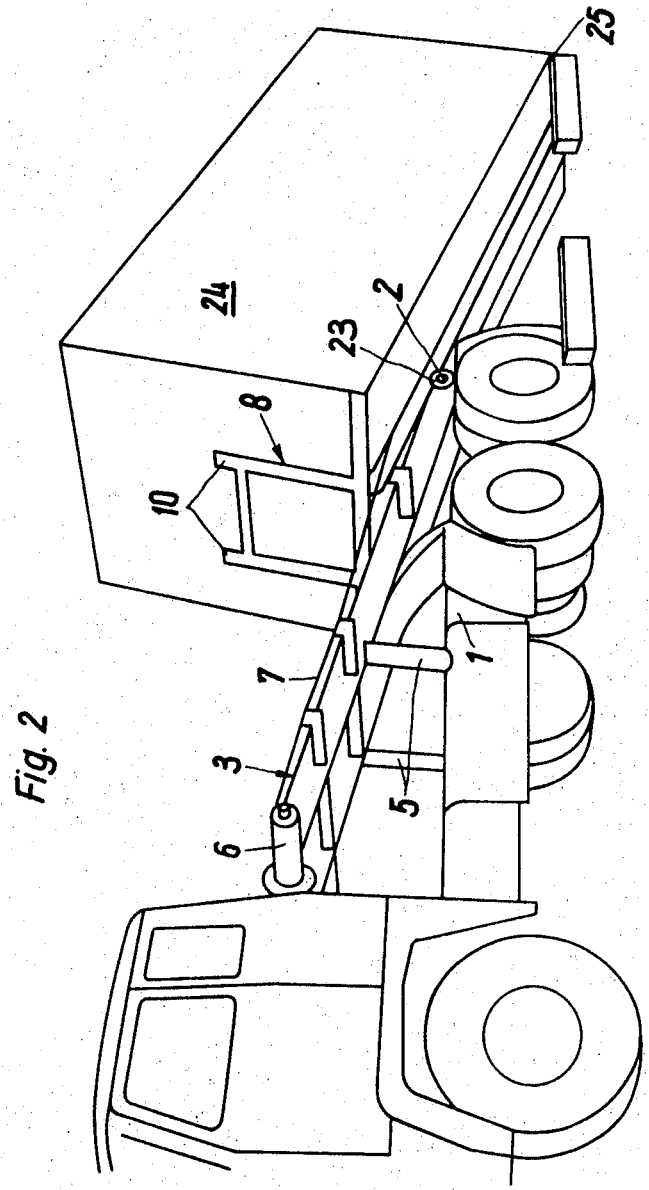

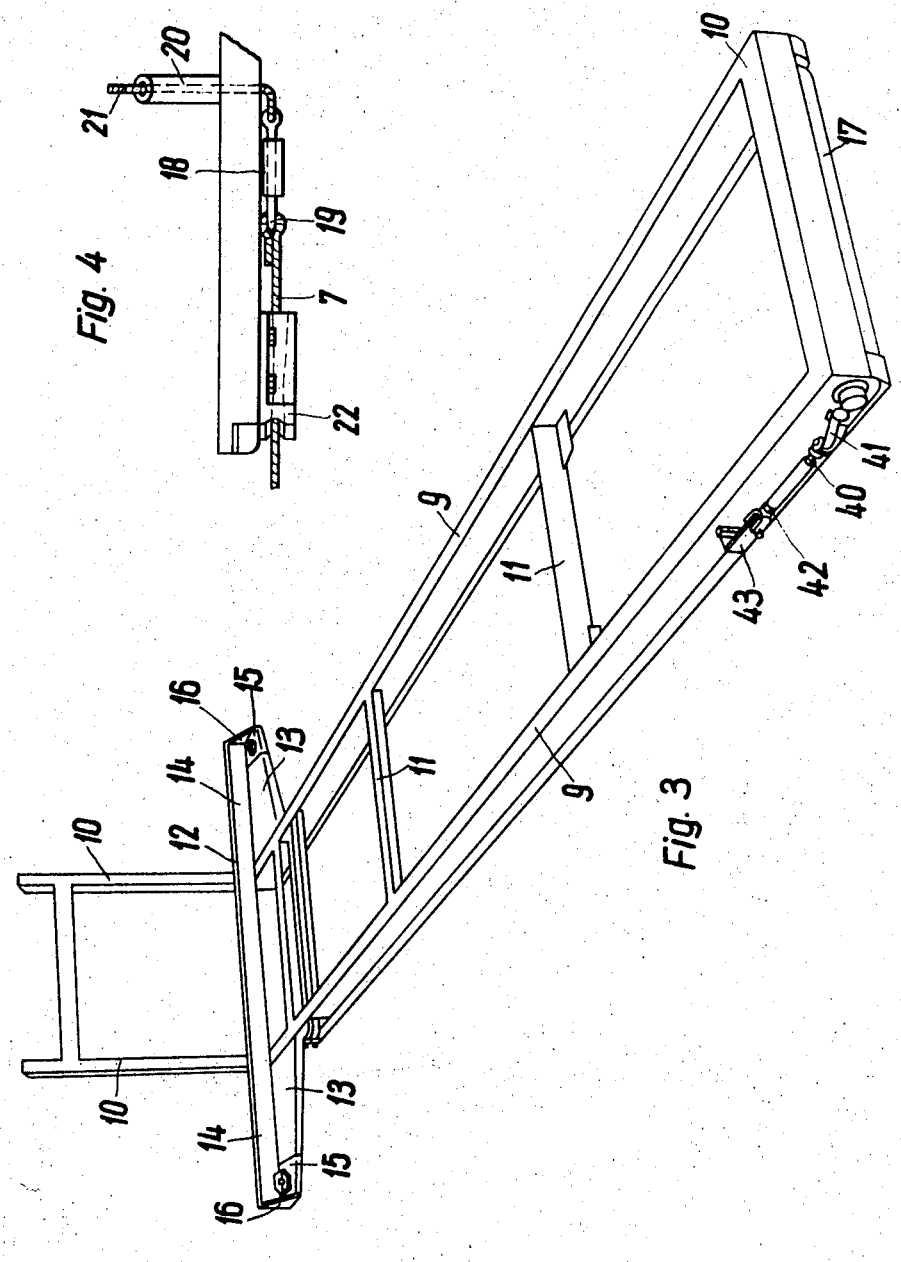

United States Patent Office 3,471,048
Patented Oct. 7, 1969

3,471,048
DEVICE FOR LOADING A TRANSPORT BOX ON A LORRY AND UNLOADING THE SAME
Mikko Terho, Raisio, Finland
Filed Oct. 17, 1967, Ser. No. 675,914
Int. Cl. B60p 1/04
U.S. Cl. 214—505                                    5 Claims

ABSTRACT OF THE DISCLOSURE

Transferable cargo apparatus which includes a platform and a container. The platform comprises two longitudinal side beams connected to each other by a transverse support and the front ends of the side beams are provided with upright poles or members as well as locking devices for securing a container. The front ends of both side beams are provided with guide plates for guiding the container and the locking devices are formed as part of the guide plates. The locking device includes a bolt together with a horizontal locking plate provided with a hole fixed to a lower surface of the front corner of the container and when the container is located on the platform the locking plate is located on top of the guide plate. The rear ends of both side beams are also provided with locking devices adapted to engage a locking plate fixed to the lower surface of the container.

---

The invention concerns a method for loading a transport box on a lorry and unloading the same by using an exchangeable cargo platform, which can be drawn onto the chassis of the lorry and lowered to the ground by means of winch and wires.

In recent times use has been made of transport boxes for transporting various goods, especially in connection with shipping and railway transport, and these transport boxes usually are so large that they are brought to the destination by a lorry, one at a time. These transport boxes are not provided with any kind of support in order to fully utilize all loading space in the ships or in the railway car. Thus the even bottom permits stowing of the boxes close on top of one another. On this account loading of such transport boxes on a lorry and unloading the same requires a crane for hoisting the boxes previously unloaded, for instance on the quay, on top of the platform of the lorry, and for lifting the platform onto the quay. Again, if the boxes were to be transferred by means of the windlass of the ship or by the harbour crane directly on or off lorries, this would mean long waits for lorries and stowing and unloading the ship would be slow.

The object of this invention is to eliminate the above disadvantages. This is accomplished by the method according to the invention, characterized in that the exchangeable platform mentioned is lowered to the ground in front of or behind the transport box, which is placed to rest on supports under its sides a distance above the ground, the exchangeable platform then being pushed under the transport box between said supports by backing the vehicle, the transport box being locked to the exchangeable platform, which together with the transport box is drawn onto the chassis of the vehicle, upon which the transport box after reaching the destination is lowered from the vehicle on top of the supports mentioned.

The invention also includes a device for carrying out the above method, which device is mainly characterized in that the exchangeable platform consists of two parallel longitudinal side beams connected by cross-bars, and provided with upright poles fixed to the front ends, against which poles the rear end of the vehicle is pushing to bring the exchangeable platform under the transport box on backing the vehicle, and that guide plates are provided on the front end sides of the side beams for guiding the front end of the transport box to its place on top of the exchangeable platform.

Figure 1:
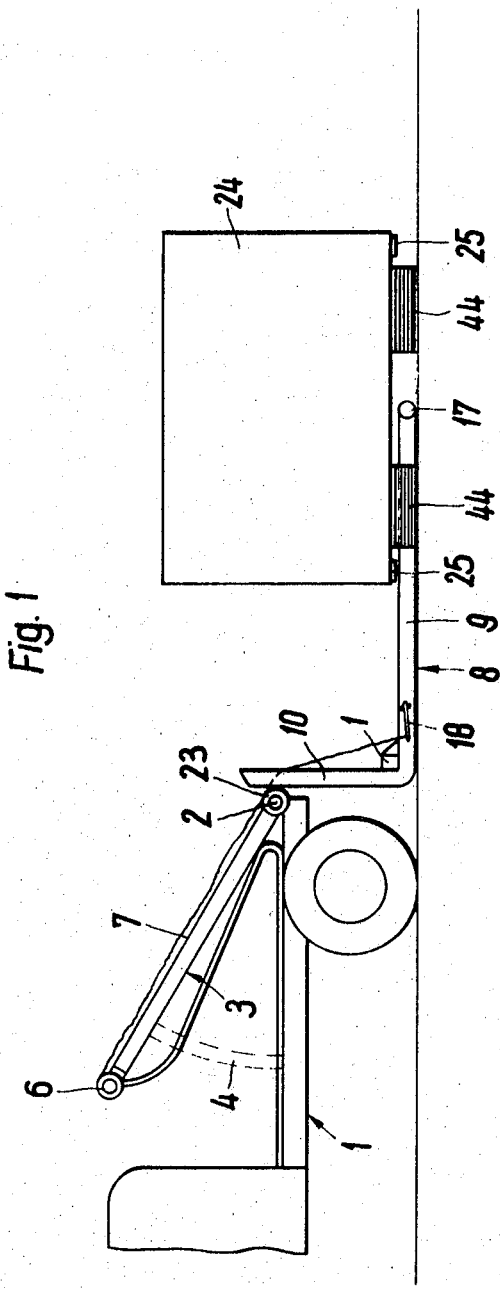
Figure 5:
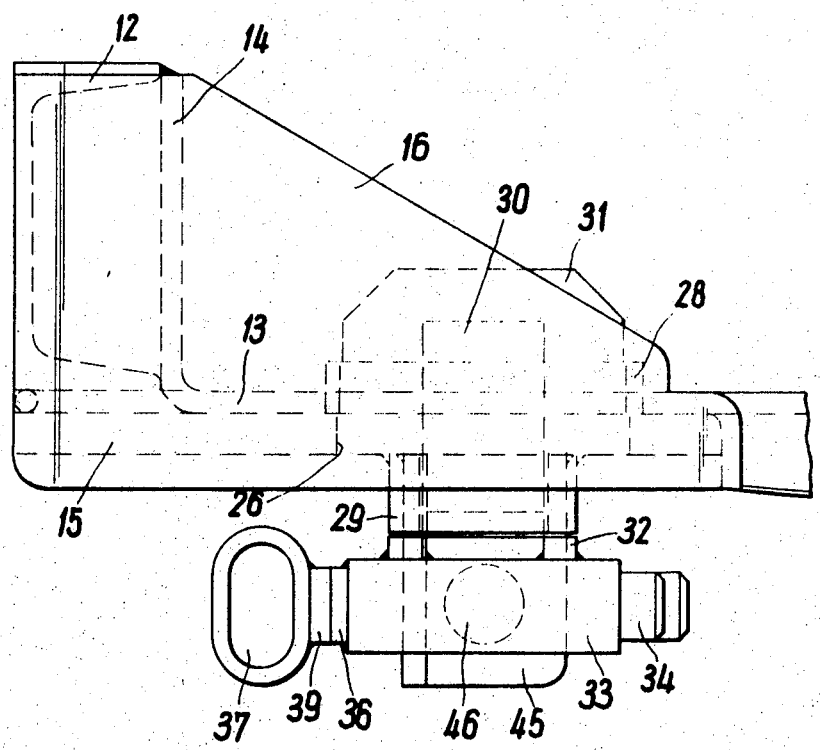
Figure 6:
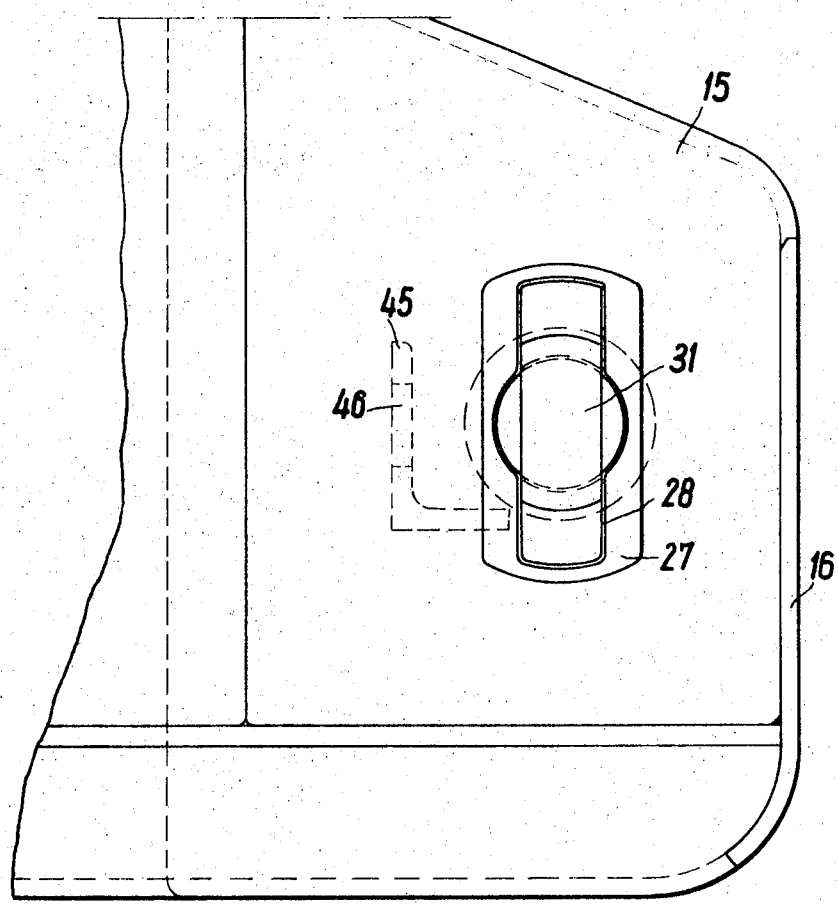
Figure 7:
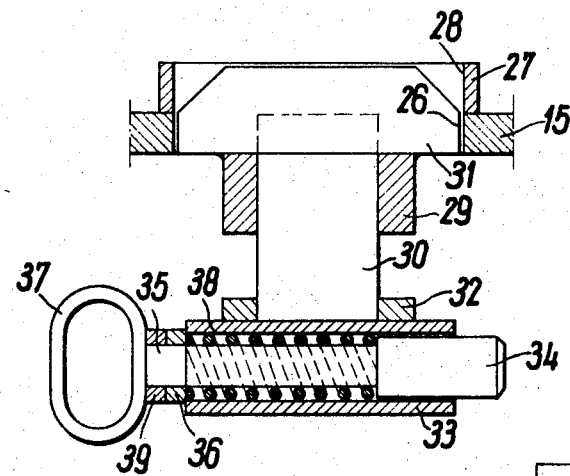
Figure 8:
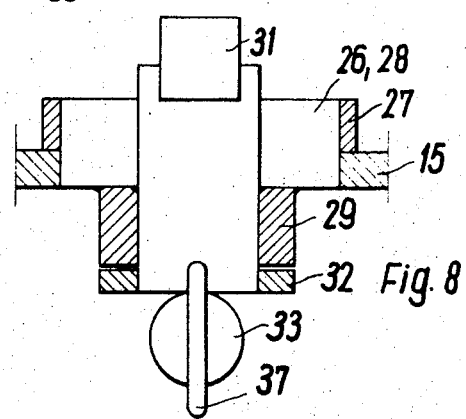
Figure 9:
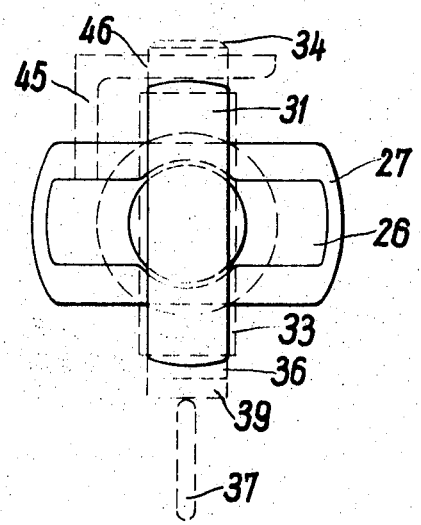

The invention is clarified further below and in the enclosed schematical drawings, in which:

FIG. 1 presents from the side the loading step where the lorry is pushing the exchangeable platform already lowered to the ground under the transport box by backing the vehicle, FIG. 2 presents a perspective view of the loading step where the transport box is locked to the exchangeable platform and is drawn onto the turn bridge of the lorry, or is lowered from this position to the ground, FIG. 3 presents a perspective view of the exchangeable platform, FIG. 4 presents from above the fastening of the wire to one of the side beams of the exchangeable platform, FIG. 5 presents from the side on a larger scale the front end of the exchangeable platform including locking device, the lock bolt of which is in raised but unlocked position, FIG. 6 presents from above the same as FIG. 5, FIG. 7 presents the locking device from the side and partly cutaway with the bolt in open position, FIGS. 8 and 9 present from the side and from above the locking device in locked position.

The invention is described below using a lorry provided with a turn bridge, which is pivotal about a transverse axis mounted to the rear end of the frame or chassis of the vehicle, onto which turn bridge an exchangeable platform is drawn for transport. However, the invention is applicable also for using a lorry provided with a rigid horizontal supporting frame for the exchangeable platform.

According to FIGURES 1 and 2 the lorry is provided with a turn bridge 3 mounted to swing about a transverse horizontal axis 2 at the rear end of the chassis or frame 1 of the lorry. This turn bridge can be raised or lowered by means of the tilting or tipping device 4 in FIG. 1, or by means of the hydraulic cylinders 5 in FIG. 2. The front end of the turn bridge has a transverse axis, to the ends of which the winch reels 6 are mounted. The winch can be driven by any suitable device not presented in the drawing. On the winch reels 6 the wires 7 are wound for drawing the exchangeable platform 8 onto the turn bridge 3, and for lowering it to the ground, with the turn bridge in tilted position. When the exchangeable platform 8 is in position on the turn bridge 3, and is locked for transport, the turn bridge is lowered to horizontal position on the chassis of the lorry. Such a lorry is described further in the Finnish patent publication No. 31,134.

According to the invention the construction of the exchangeable platform 8 concerned is seen best in FIG. 3. This platform is made up of two parallel longitudinal side beams 9, connected by transverse supports 11 with upright poles 10 attached to the fore ends and supported by a transverse support. Behind the upright poles 10 on top of the side beams 9 a transverse bar 12 is attached, both ends of which extend outside of the side beams 9 in the side direction. Horizontal supporting plates 13, quadrangular as seen from above, are fixed by welding to the outside edge of the side beams 9 on the same level with the upper surface of the beams 9, which supporting plates 13 narrow off outwardly extending some distance off the end of the transverse bar 12. Both supporting plates 13 have an upwardly turned edging 14 at their front edge, which is welded to the rear surface of the transverse bar 12. Furthermore, as best seen in FIGS. 1 and 3, the rear edge of the supporting plate 13 is turned downwardly a little. As an extension to the outer end of both supporting plates 13 a horizontal guide plate 15 is fixed by welding to the lower surface of the supporting plate and to the transverse bar 12, which guide plate 15 extends as far as the end of the transversal bar 12. There is also a triangular side plate 16, welded to the end of the transverse bar 12 and the guide plate 16, with one edge directed diagonally rear and downwardly. Between the side plate 16 and the outer edge of the supporting plate 13 a steering track is formed with the side plate 16 and the outer edge of the supporting plate 13 as sides, and with the upper surface of the guide plate 15 as bottom. Each guide plate 15 is also provided with a locking device, and likewise the rear ends of the side beams as further described below. According to FIG. 3 a roller 17, wheels, or the like, are provided on a transverse axis mounted to the rear end of the side beams 9 of the exchangeable platform. The object of the roller is to keep the rear end of the exchangeable platform 8, when lowered to the ground or other foundation, a little above the point, at which it is rolling along in moving the platform.

In order to draw the platform 8 onto the turn bridge 3, and to lower it from here to the ground, the ends of the wires 7 coming from the reels 6 are to be connected to the exchangable platform. To this end a sleeve 18 is fixed to the outer surface (see FIGS. 1, 2, and 4) of the front end of each side beam 9, in which sleeve the arm of a fastening hook, provided at its forward end with a hook 19, is able to move. When the rear ends of the fastening hook arms are joined across the exchangeable platform by a wire 21 running inside the tube 20, or a transverse U shaped bar, and the loops at the ends of the wires 7 are connected to the hooks 19, the wires 7 including fastening hooks are in a way forming one single wire. Naturally, however, the ends of the wires 7 can be fastened to the exchangeable platform 8 in some other way too. From the fastening hook 19 the wires are brought by way of a groove in the lower and front surface of the guiding members 22, fixed to the sides of the forward end of the side beams 9, and over the guide wheels 23 at the ends of the shaft 2 at the guiding members to the reels 6 of the winch.

In order to fasten the transport box 24 according to FIGS. 1 and 2, made of steel plate with reinforcements at the corners, to the exchangeable platform 8 during hoisting and lowering, both are provided with locking devices operating together. The locking device on the transport box 24 comprises a horizontal locking plate 25 (FIG. 1) attached to the lower surface of each corner of the box and provided with a hole of a shape presented further below. The locking devices for the exchangeable platform 8 are described as follows.

The locking devices at the front end of the exchangeable platform 8 are illustrated in FIGURES 5–9, and because the locking devices are similar at both sides only one is described. An oval hole 26 is made in the centre of the guide plate 15, the centre of which hole is enlarged towards the sides to circular shape. At this hole a bolt plate 27 is fixed to the upper surface of the guide plate 15 in such a way, that the hole 28 in the bolt plate coincides with the hole 26. Both holes 26 and 28 are equally large and equally shaped. The bolt plate 27 has a rectangular shape and is rounded at its front and rear ends. A hole corresponding to the shape of the bolt plate is made in the locking plates 25 attached to the bottom surface of the corners of the transport box 24. The size of this hole is such that the bolt plate just fits into it. At the centre of the hole 26 a sleeve 29 is fixed to the lower surface of the guide plate 15 with a vertically movable and turnable plug 30 of round cross-section fitting into it. Attached on top of this plug is the actual lock bolt 31 with oval shape from the side and rectangular from above. The upper corners at the ends of the bolt 31 are bevelled or rounded, and its height is chiefly the same as the combined thickness of the guide plate 15 and the bolt plate 27. A stop ring 32 is fixed to the lower end of the plug 30 with the same diameter as that of the sleeve 29. This stop ring 32 permits the bolt 31 to be lifted only as high as when the upper surface of the stop ring rests against the lower surface of the sleeve 29, the lower surface of the bolt 31 is located a little above the upper surface of the bolt plate 27. In order to move the bolt 31 vertically, and to rotate it, a horizontal sleeve 33 is fixed to the lower end of the stop ring 32, parallel to the longitudinal direction of the bolt 31. In order to lock the bolt to the raised locking position described further below, a locking plug 34 is fitted into the sleeve 33 (see FIG. 7), the arm 35 of which extends outside of the sleeve through the ring 36 fixed to the opposite end of the sleeve, and is provided at the end with a handle 37. A coil spring 38 is fitted around the arm 35 with one end resting against the inner end of the locking plug, and with the other end resting against the ring 36, at which the spiral spring strives to push the locking plug 34 otuwardly, so that its end protrudes from the end of the sleeve 33. To prevent the locking plug 34 from extending too far out, a stop ring 39 is fixed to the arm 35 in front of the handle 37 resting against the end of the sleeve 33 when the plug is pushed out. By pulling the handle the end of the locking plug 34 can be brought inside of the sleeve 33. The operation of these locking devices is clarified further in connection with describing the application of the method according to the invention.

According to FIG. 3 the locking device on both sides of the rear end of the exchangeable platform 8 consists of some kind of a stretching screw arrangement. The rear end of the one screw 40 is pivotally connected to the handle 41, which is hinged to the side beam 9, and a hook 43 is pivotally connected to the forward end of the other screw 42, which hook in locking position is brought to catch around the edge of the hole in the locking plate 25, located at the rear end corners of the transport box 24, by turning the sleeve provided with inner thread connecting the screws 40 and 42. To prevent this arrangement from hanging in free position, it is attached by the hook 43 to a holder on the side beam. Naturally, any type of suitable quick coupling may be used instead of the streching screw arrangement described above.

Loading of the transport box 24 on the lorry is done as follows: The exchangeable platform 8 is lowered to the ground in front of or behind the transport box 24 which rests on suitable supports 44, from the tipped turn bridge 3 by making use of a winch and wires 7. On lowering the exchangeable platform the roller 17 at the rear end contacts the ground first and rolls along to make the exchangeable platform move easier. The supports mentioned are situated under the side edges of the transport box, and consist in this case of bundles of board 44, but naturally one may use supports of any kind keeping the transport box 24 above the ground a little higher than the side beams 9 of the exchangeable platform. The locking devices at the front end of the exchangeable platform are now in open position, at which, according to FIG. 7, the bolt 31 is situated in the openings of the bolt plate 27 and the guide plate 15 and rests with its lower surface against the upper surface of the sleeve 29, while the upper surface of the bolt is level with the upper surface of the bolt plate. Then the lorry is backing, so that its rear end while resting against the upright poles of the exchangeable platform 8 pushes the side beams 9 of the platform under the transport box 24 between the supports 44. The exchangeable platform is pushed so far that its forward end, guided by the guide track of the guide plates 15, will rest against the transverse bar 12, at which the holes in the locking plates 25 at the front end corners of the transport box are situated at the bolt plates 27. Because the transport box will rest against the transverse bar 12, the upright poles 10 will not touch at all the gable end of the transport box, and cannot thus cause scratches on it, or other damage. After this the forward end of the exchangeable platform 8 is raised a little by means of the wires 7, at which the bolt plates 27 enter into the holes in the locking plates 25 of the transport box. From the handle 37 the bolt 31 is then lifted to upper position according to FIGURES 5, 6, 8, and 9, at which the bolt 31 will be located in the hole of the locking plate 25 of the transport box, and the lower surface of the bolt at the upper surface of the locking plate 25, or somewhat above. Hereafter the end of the locking plug 34 is drawn by the handle 37 inside the sleeve 33, the bolt is turned 90° to the locking position shown in FIGS. 8 and 9, and the handle 10 is let free, at which the locking plug 34 is pushing into the hole 46 in the angle-iron 45, which is fixed to the lower surface of the guide plate 15. Thus the bolt 31 stays in locking position crosswise with respect to the oval hole in the locking plate 25, and is unable to come loose from its place above the locking plate of the transport box. After locking the fore end of the transport box 24 the rear end is locked, while the transport box is still resting on its supports 44. In order to lock the rear end the fastening hooks 43, which are hinged to the rear end of the side beams 9 of the exchangeable platform, are turned in such a way, that the hook enters the hole in the locking plate 25 of the transport box, upon which the hook is tightened to grasp around the edge of the hole mentioned by turning the threaded sleeve on the stretching screws 40 and 42. When both corners at the rear end of the transport box 24 are locked, the exchangeable platform 8 including transport box is drawn onto the tipped turn bridge 3, this is lowered to horizontal position on the chassis 1 of the lorry, and the exchangeable platform is fixed to the turn bridge 3 by means of suitable locking devices not presented in the drawing. The transport box is now ready for transport to the destination.

Unloading of cargo is carried out in the opposite order to that of the loading procedure presented above, at which the exchangeable platform 8 including transport box 24 is allowed to slide down by tilting the turn bridge until the roller 17, or the like, at the rear end of the exchangeable platform is touching the ground. Hereafter the supports 44 are put in position and the transport box 24 is lowered on top of them, the locks are opened and the exchangeable platform 8 is drawn back onto the turn bridge 3.

Although the above presentation of the invention concerns loading of a transport box, it can also be applied for loading, for instance, staple goods, at which the exchangeable platform in the manner presented above is pushed under the pile stacked on top of wooden poles running lengthwise, which is drawn together with the platform onto the turn bridge or the chassis of the vehicle. In order to prevent the pile from falling apart, upright poles may be attached behind the pile at the end of the platform, or the pile may be fixed in other ways, for instance, by tying it to the platform.

The invention is naturally not restricted to the above presented working example, but it can be varied even considerably as to details within the scope of the invention. This particularly concerns the type of locking devices in the exchangeable platform.

I claim:
1. Transferable cargo apparatus including a platform and a container, which platform can be transferred onto and off from the chassis or tilting chassis of a vehicle, said platform comprising two longitudinal and parallel side beams connected to each other by a transverse support and provided with upright members at the fore ends of the side beams, locking devices for securing said container characterized in that the fore end of both side beams is provided with a guide plate extending sideways for guiding said container in its place on top of the transferable platform, each guide plate being provided with a locking device which includes a bolt which operates together with a horizontal locking plate provided with a hole and fixed to a lower surface of the front corner of said container, when this is guided onto the platform where the locking plate is situated on top of the guide plate and in addition the rear end of both side beams is provided with a locking device able to engage a locking plate of the said type fixed to the lower surface of said container.

2. Transferable cargo apparatus as claimed in claim 1 for transporting said container characterized in that both of the said guide plates are connected to a horizontal supporting plate fixed to the fore end of the side beams and extend sideways horizontally, a vertical plate is provided at the front surface of the guide plate and the supporting plate, a vertical side plate is provided at the side edge of the guide plate so as to form a guide track for the locking plate situated on the lower surface of the front corner of said container, which guide track is bounded on one side by said side plate and on the other by the outer edge of said supporting plate and below by said guide plate forming the bottom.

3. Transferable cargo apparatus as claimed in claim 2 for transporting said container, characterized in that the locking device in both guide plates includes a bolt plate which is fixed to the upper surface of the guide plate and is provided with a central oblong hole which is situated opposite a hole of corresponding shape made in the guide plate, a vertical sleeve fixed to the lower surface of the guide plate opposite the said holes, a peg fitted into said sleeve and fixed to the said oblong bolt by its upper end, which bolt fits into the said holes and the hole provided in the locking plate of the container, as well as a means provided at the lower end of the peg for moving the bolt vertically and turning it to locking and free position.

4. Transferable cargo apparatus as claimed in claim 3 characterized in that the said means comprises a sleeve fixed vertically to the lower end of the peg, a locking peg fitted into the sleeve and at one end provided with a handle, said locking peg sticking out from the end of the sleeve due to the power of a spring and operating together with a support fixed to the lower surface of the guide plate to keep the bolt in locked position.

5. Transferable cargo apparatus as claimed in claim 1, characterized in that the locking device provided at the rear end of both side beams comprises a stretching screw device, the one end of which is turnably connected to the side beam and the other end is provided with a hook or the like, which when the container is in position on top of the platform can be brought to catch on the locking plate at the corresponding corner of the container.

References Cited
UNITED STATES PATENTS

| | | | |
|---|---|---|---|
| 2,580,501 | 1/1952 | Anderson et al. | 214—517 |
| 3,111,341 | 11/1963 | Fujioka et al. | |
| 3,363,803 | 1/1968 | Abolins | 296—35 XR |
| 3,376,987 | 4/1968 | Lohse | 214—517 XR |

ALBERT J. MAKAY, Primary Examiner

U.S. Cl. X.R.

214—517; 296—35